T. SMITH.
PACKING.
APPLICATION FILED NOV. 18, 1913.
1,103,322.
Patented July 14, 1914.
2 SHEETS—SHEET 1.
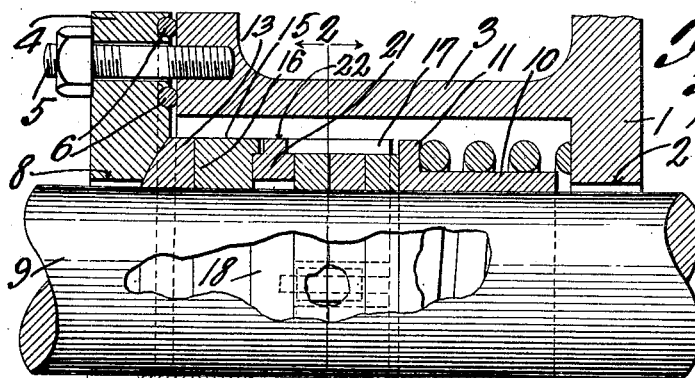
Fig. 1.
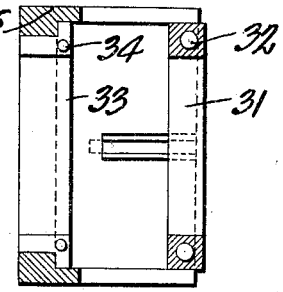
Fig. 8.
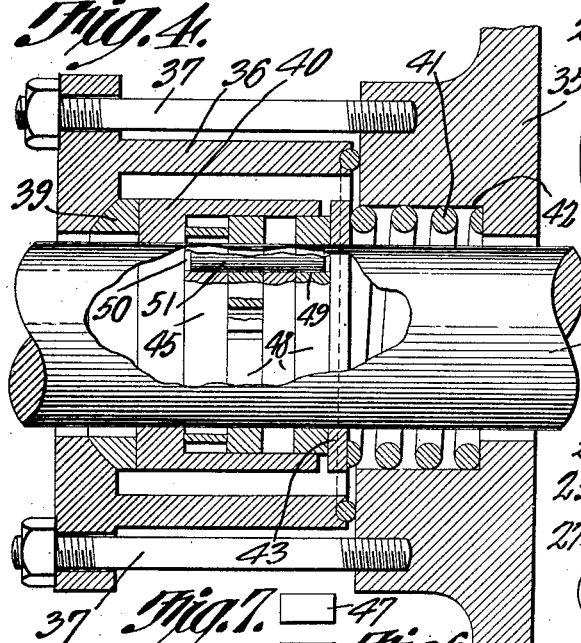
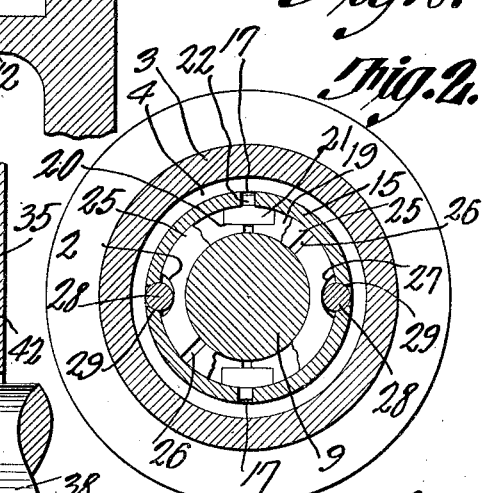
Fig. 2.
Fig. 3.
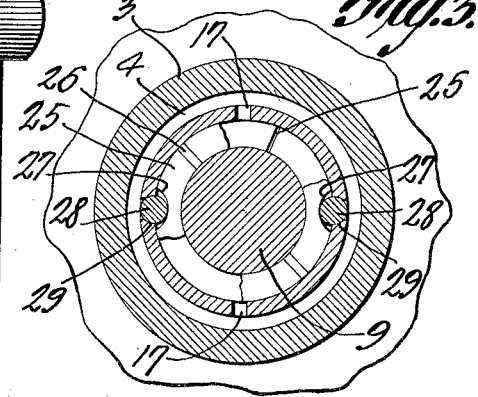
Witnesses
Thomas Smith, Inventor
by C. A. Snow & Co., Attorneys T. SMITH.
PACKING.
APPLICATION FILED NOV. 18, 1913.
1,103,322.
Patented July 14, 1914.
2 SHEETS—SHEET 2.
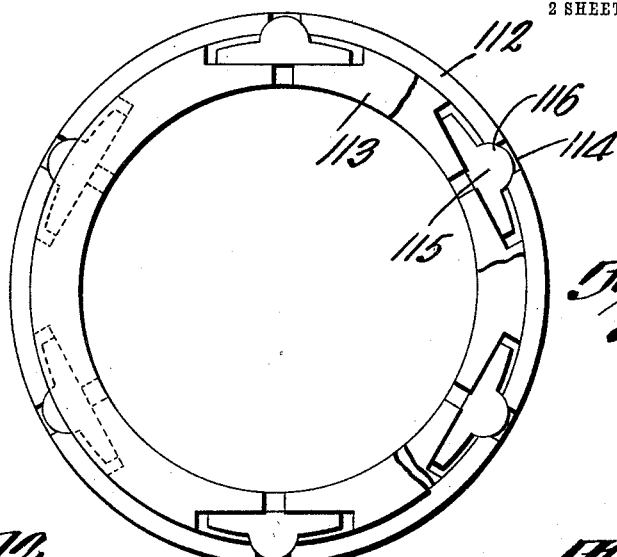
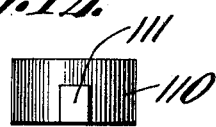
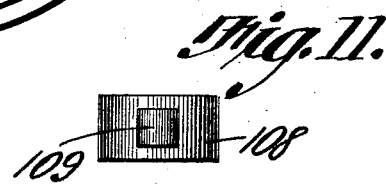
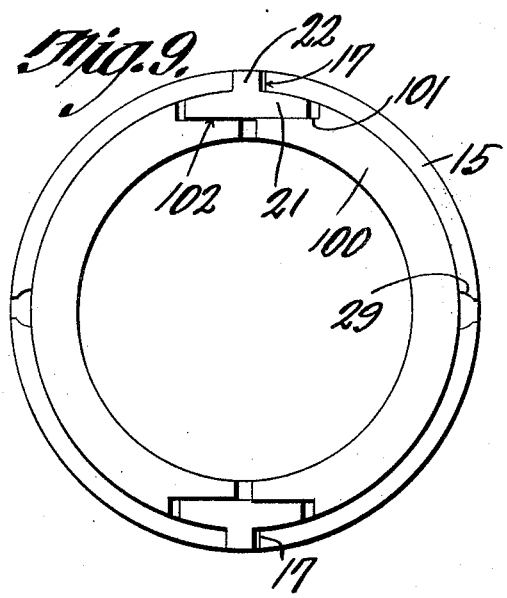
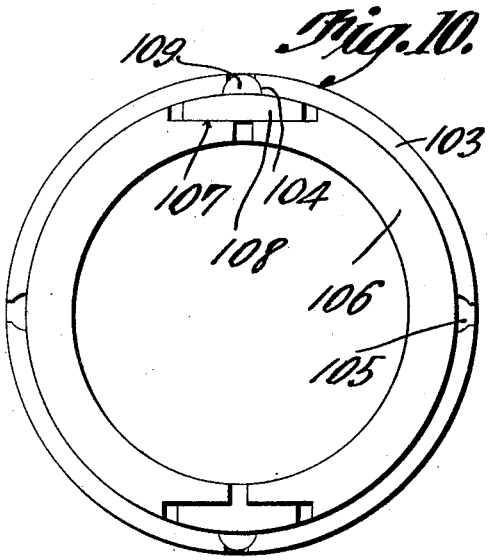
Witnesses
Thomas Smith, Inventor
by C. A. Snow & Co.
Attorneys

UNITED STATES PATENT OFFICE.

THOMAS SMITH, OF SAN LUIS POTOSI, MEXICO.

PACKING.

1,103,322.  Specification of Letters Patent.  Patented July 14, 1914.

Application filed November 18, 1913. Serial No. 801,686.

*To all whom it may concern:*

Be it known that I, THOMAS SMITH, a citizen of the United States, residing at San Luis Potosi, Mexico, have invented a new and useful Packing, of which the following is a specification.

The device forming the subject matter of this application is a packing, adapted to surround a reciprocating element, such as a piston rod, to prevent fluid pressure from leaking along the surface of the rod, longitudinally of the same.

This invention aims to provide a packing so constructed as to meet the demands occasioned by any and all structures, and to prevent the pressure from escaping from an inclosing chamber, such as a cylinder, into the atmosphere.

Another object of the invention is to provide a packing for piston rods, comprising a plurality of segmental rings, novel means being provided for holding the segmental rings against rotation, whereby the spaces between the adjacent ends of the constituent members of the rings may be maintained out of alinement in successive rings.

Another object of the invention is to provide novel means for assembling the packing rings and for holding the same in place within the gland and, more specifically within the ring holding cup so that the pressure upon the rings longitudinally of the rod may be adjusted, thereby regulating the constricting effort of the rings upon the rod.

With the above and other objects in view which will appear as the description proceeds, the invention resides in the combination and arrangement of parts and in the details of construction hereinafter described and claimed, it being understood that changes in the precise embodiment of the invention herein disclosed can be made without departing from the spirit of the invention.

In the accompanying drawing:—Figure 1 shows in longitudinal section, one form of the invention; Fig. 2 is a cross section on the line 2—2 of Fig. 1 looking to the left; Fig. 3 is a cross section on the line 2—2 of Fig. 1, looking to the right; Fig. 4 is a longitudinal section showing a modified form of the invention; Fig. 5 is a side elevation showing one of the packing rings; Fig. 6 is an elevation of the key or bridge which is assembled with the ring shown in Fig. 5; Fig. 7 is a plan of the bridge which is shown in Fig. 6; Fig. 8 is a longitudinal section of the ring holding cup, the view depicting a modification applicable to either of the forms hereinbefore described; Fig. 9 is an end elevation of the cup as employed in Fig. 1, one of the rings and the bridges thereon appearing in elevation; Fig. 10 is a view similar to Fig. 9 but showing a slight modification; Fig. 11 is a top plan of one form of bridge; Fig. 12 is a top plan showing a modified form of bridge; Fig. 13 is an end elevation of the cup, certain of the rings therein being broken away, Fig. 13 illustrating a modification.

In the accompanying drawing, the numeral 1 indicates a cylinder head having an opening 2 and provided with a stuffing box 3. Applied to the end of the stuffing box 3 is a gland 4 held in place by bolts 5 or in any other suitable manner, packing rings 6 being interposed between the gland 4 and the end of the stuffing box 3, the gland 4 being recessed as indicated at 7, if desired, to receive the packing rings 6. The gland 4 is provided with an opening 8. Mounted to reciprocate in the openings 2 and 8 is a piston rod 9 the diameter of which preferably is slightly less than the diameter of the openings 2 and 8.

An abutment ring 10 surrounds the rod 9 adjacent the cylinder head 1 and is provided with an outstanding flange 11 receiving one end of a compression spring 12, the other end of which abuts against the cylinder head 1.

Surrounding the rod 9 adjacent the gland 4 is a joint ring 13, the forward end of which is received in a recess 14, in the inner face of the gland 4. The recess 14 and the abutting face of the joint ring 13 are curved or concaved outwardly, upon an arc, the center of which lies within the stuffing box 3, the construction being such that the joint ring 13 may be permitted to have a slight swinging movement in the recess 14, along with the rod 9, after the manner of a ball and socket joint. To the rear of the joint ring 13, the rod 9 is surrounded by a cup 15 having an end wall 16 which abuts against the joint ring 13. In the side wall of the cup 15 longitudinal slots 17 are formed. The slots 17 are shown as being disposed opposite to each other, although any number of slots may be provided. Alternating with the slots 17 and preferably disposed 90° therefrom are longitudinally extended seats 29 which are of curved or semi-cylindrical transverse outline. Disposed within the cup 15 and abutting against the end wall 16 of the cup is a primary ring 18 comprising segmental parts 19, the ends of which are spaced apart slightly as will be understood from Fig. 2. The adjacent ends of the parts 19 of the ring 18 are equipped with rectangular seats 20 adapted to receive bridges 21 having ribs 22 which register in the longitudinal slots 17 of the cup 15. The bridges 21 are of the same width as the ring 18. Disposed to the rear of the primary ring 18 are other rings 23 and 24, the rings 23 and 24 being in mutual abutment, the ring 23 abutting against the ring 18. These secondary rings 23 and 24 comprise, each, segmental parts 25 spaced apart as indicated at 26. The parts 25 of the rings 23 and 24 are equipped in their peripheries with concaved seats 27. The radii of the seats 27 are longer than the radii of the seats 29 in the cup 15. Engaged in the seats 29 of the cup 15 and in the seats 27 of the ring parts 25 are cylindrical keys 28. The keys 28 in peripheral outline conform closely to the seats 29 in the cup 15, but fit somewhat loosely in the seats 27 of the ring parts 25.

The rearmost secondary ring 24 abuts against a ring 30, surrounding the rod 9 and in its turn abutting against the flange 11 of the ring 10. This ring 30 which is partially engaged within the cup 15 is a carrying ring merely and ordinarily has no prehensile action with respect to the rod 9. However, at times, an expansion of the carrying ring 30 may be necessary, notably, if there are any projections upon the rod 9. With this end in view, the ring 30 may consist, as shown in Fig. 8, of separable parts 31 united by dowel pins 32. With the same end in view, the opening in the cup 15 may be of any desired diameter, and if deemed expedient as shown in Fig. 8, the opening in the cup may be provided with a multi-part bushing 33, united by dowel pins 34.

In practical operation, the bridges 21 are mounted in the seats 20 of the primary ring 18, and the ring is pushed forwardly into place, the ribs 22 on the bridges 21 registering in the longitudinal slots 17 of the cup 15. In this manner, the primary ring 18 is prevented from rotating in the cup. The cylindrical keys 28, which are about one-sixteenth of an inch in length less than the combined widths of the secondary rings 23 and 24, are mounted in the seats 27 of the rings and in the seats 29 of the cup 15. Thus it will be seen that the rings 24 and 23 cannot rotate to any appreciable extent within the cup. Since all of the rings 24, 23 and 18 cannot rotate within the cup, the openings existing between the constituent segmental parts of the several rings will be held out of alinement longitudinally of the rod 9 and consequently there will be no continuous passing through the rings, through which fluid pressure may leak away. Especial attention is directed to the fact that the keys 28 are of cylindrical form and that the radii of the keys 27 in the rings 23 and 24 are of greater length than the radii of the seats 29 in the cup 15. Owing to these features, the rings 23 and 24 will adjust themselves properly to the internal diameter of the cup 15 and the external diameter of the rod 19.

As will be understood readily from Fig. 1, the compression spring 12, abutting against the cylinder head 1 and against the flange 11 of the ring 10, advances the ring 10, together with the rings 24, 23, 18, the cup 15 and the joint ring 13, the result being that a fluid tight joint is effected circumferentially of the rod 19 by the packing rings 18, 23 and 24.

Referring to the modified form of the invention shown in Figs. 4 to 7, this form of the device resembles in many particulars, the structure delineated in Fig. 1. The description, therefore, may be shortened accordingly.

In Figs. 4-7, the cylinder head is denoted by the numeral 35 and the gland at 36, the latter being separable from the cylinder head and being assembled therewith by means of bolts 37 or the like. The reciprocating rod is indicated at 38 and the rocking joint ring is shown at 39. The numeral 40 designates the cup and the compression spring is shown at 41, the same being received at one end in a recess 42 formed with the cylinder head. The abutment ring 43 which is engaged in the forward end of the compression spring 41 is shown as somewhat thinner than the abutment ring 10—11 of Fig. 1. The primary packing ring is shown at 45 and comprises separable segmental parts having slots 46 in their meeting ends, adapted to receive bridges 47, shown in Figs. 6 and 7 as relatively thin plates of the same width as the primary ring 45.

The secondary rings are indicated at 48 and comprise separable segmental parts.

In this form of the invention, all of the rings 45 and 48 are provided with seats 49 coöperating with seats 50 in the cup 40, the relative radii of the seats remaining as hereinbefore described and the cylindrical keys 51 being used as above mentioned. The length of the cylindrical key 51 is slightly less, say one-sixteenth of an inch, than the combined width of the several rings 45 and 48. Obviously, the keys 51, coöperating with the seats 49 and 50 permit the several packing rings to coöperate properly with the rod 38 and with the cup 40, without however, permitting the openings between the parts of the several rings to come into alinement longitudinally of the rod 38.

For convenience in claiming the invention, the cylinder head 1, the stuffing box 3 and the gland 4 or the cylinder head 35 and the gland 36, may be described as an "inclosing structure."

In Fig. 9 one of the segmental rings is denoted generally by the numeral 100, the seats being denoted by the numeral 101. If there is a steam pressure within the seats 29, the parts of the segmental ring 100 will be forced toward the center of the cup. Now, so long as the slots 17 are exactly opposite to each other, and so long as the ribs 22 on the bridges 21 are located exactly midway between the ends of the bridges, the structure will operate satisfactorily, but, in practice, these ideal conditions rarely exist. As a consequence, when the parts of the segmental ring 100 move toward the center of the cup, the bridges 21 are tilted and an opening, indicated at 102 exists between the inner face of the bridge 21 and the corresponding portion of the seat 101, thus allowing a leakage of steam. In order to avoid this undesirable result above referred to, the structure shown in Fig. 10 may be resorted to. In Fig. 10, the cup is indicated at 103 and the longitudinal slots therein are indicated at 104, these slots 104 being of curved cross sectional contour, the recesses being indicated at 105. The segmental ring is shown at 106 and is provided with seats 107 receiving bridges 108, the same having lugs or ribs 109 which are rounded or curved to conform to the curvature of the slots 104. As shown in Fig. 11, the rib or lug 109 is located adjacent the center of the bridge 108 but, if desired, as shown in Fig. 12, wherein the bridge is indicated at 110, the curved lug or rib 111 may be located adjacent one end of the bridge, depending upon the manner in which the bridge and the ring assembled therewith are mounted in the cup. Owing to the fact that the bridge 109 is curved, and owing to the fact that the slot of the cup is curved as indicated at 104, the bridges 108 will be permitted to have a rocking movement, and thus will conform properly to the seat 107, the opening indicated at 102 in Fig. 9 being avoided. Obviously, the construction depicted in Fig. 10 may be employed in the structure shown in Fig. 1 or in that shown in Fig. 4, or under other circumstances which will readily suggest themselves to the user, it being unnecessary to describe and illustrate many modifications depending merely upon the number and the positions of the packing rings in the cup.

Where a high steam pressure is to be contended with, the structure depicted in Fig. 13 will be found useful. In Fig. 13 the cup is indicated at 112 and the slots or seats are shown at 114, the same being curved transversely as hereinbefore described. A plurality of packing rings 113 are provided, the bridges being shown at 115 and the lugs or ribs thereon at 116. The bridges in the successive rings are disposed in break-joint relation, as will be understood readily from Fig. 13.

Having thus described the invention, what is claimed is:—

1. In a packing of the class described, a reciprocating element; a segmental ring surrounding the reciprocating element and having a curved external seat; a cup surrounding the ring and having a curved internal seat; a cylindrical key lodged in the seats; means for limiting the movement of the cup longitudinally of the reciprocating element; and means for moving the ring longitudinally of the reciprocating element.

2. In a packing of the class described, a reciprocating element; a segmental ring surrounding the reciprocating element and having a curved external seat; a cup surrounding the ring and having a curved internal seat, the seats being of different radii; a cylindrical key loosely mounted in one seat and conforming to the curvature of the other seat; means for limiting the movement of the cup longitudinally of the reciprocating element; and means for moving the ring longitudinally of the reciprocating element.

3. In a packing of the class described, an inclosing structure; a ring abutting against the inclosed structure; a cup abutting against the ring; segmental rings within the cup; means for preventing the segmental rings from rotating in the cup; and a rod mounted to slide in the segmental rings; the abutting faces of the first specified ring and the inclosing structure being curved upon an arc, the center of which is located within the inclosing structure, thereby to permit the cup and the first specified ring to rock as one piece with respect to the inclosing structure, upon a rocking movement of the rod.

4. In a packing of the class described, a reciprocating element; a cup surrounding the reciprocating element and provided with a seat and with a slot; a primary segmental ring located within the cup; a bridge assembled with the primary segmental ring and engaged in the slot; secondary segmental rings located within the cup; a key engaged with the peripheries of both of the secondary segmental rings and engaged in the seat; means for limiting the movement of the cup longitudinally of the reciprocating element and means for moving the rings longitudinally of the reciprocating element.

5. In a packing of the class described, a reciprocating element; a cup surrounding the reciprocating element, the cup being provided with a longitudinal slot and having a curved internal seat; a primary segmental ring located within the cup; a bridge engaged with the segmental ring and including a rib engaged in the slot; a secondary segmental ring located within the cup and provided with an external, curved seat; a cylindrical key engaged in the seats; means for limiting the movement of the cup longitudinally of the reciprocating element; and means for moving the rings longitudinally of the reciprocating element.

6. In a packing of the class described, an inclosing structure; a rod mounted to reciprocate in the inclosing structure; a cup surrounding the rod; a packing ring interposed between the cup and one end of the inclosing structure; a primary segmental ring located within the cup; means for preventing relative rotary movement between the primary ring and the cup; a pair of secondary rings located within the cup; a single element interlocked with the secondary rings and the cup to prevent relative rotary movement between the secondary rings upon the one hand, and between the secondary rings and the cup upon the other hand; a carrying ring surrounding the rod and abutting against one secondary ring; an abutment ring surrounding the rod and engaging the carrying ring; and a spring interposed between the abutment ring and the inclosing structure.

7. In a packing of the class described, a cup having a longitudinal groove which is transversely curved; a segmental ring in the cup and provided with a seat; and a bridge mounted upon the seat, the bridge being provided with a projecting rib which is curved to conform to the groove and is adapted to rock in the groove.

In testimony that I claim the foregoing as my own, I have hereto affixed my signature in the presence of two witnesses.

THOMAS SMITH.

Witnesses:
  THOMAS D. JENSON,
  VENA D. BONNEY.

---

Copies of this patent may be obtained for five cents each, by addressing the "Commissioner of Patents, Washington, D. C."